(12) United States Patent
Kaneda

(10) Patent No.: US 6,992,720 B2
(45) Date of Patent: Jan. 31, 2006

(54) OPTICAL APPARATUS INCLUDING IMAGE PICK-UP DEVICE AND INTERCHANGEABLE LENS WITH CONTROLLER FOR CONTROLLING CHANGE OF APERTURE

(75) Inventor: Naoya Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 10/000,084

(22) Filed: Dec. 4, 2001

(65) Prior Publication Data

US 2002/0071048 A1 Jun. 13, 2002

(30) Foreign Application Priority Data

Dec. 8, 2000 (JP) ............... 2000-374075

(51) Int. Cl.
 *H04N 5/225* (2006.01)
 *H04N 5/238* (2006.01)

(52) U.S. Cl. .............. 348/363; 348/340; 348/360
(58) Field of Classification Search ................ None
 See application file for complete search history.

(56) References Cited

U.S. PATENT DOCUMENTS

| | | | |
|---|---|---|---|
| 4,490,028 A * | 12/1984 | Kucher .................. | 396/8 |
| 5,040,068 A * | 8/1991 | Parulski et al. ......... | 348/376 |
| 5,087,978 A | 2/1992 | Heida .................... | 358/228 |
| 5,402,202 A * | 3/1995 | Washisu et al. ......... | 396/235 |
| 5,532,782 A | 7/1996 | Mori et al. ............. | 354/402 |
| 5,587,766 A | 12/1996 | Kawamura et al. ...... | 396/257 |
| 5,857,121 A * | 1/1999 | Arai et al. ............. | 396/51 |
| 6,069,651 A * | 5/2000 | Tsuyuki et al. ......... | 348/75 |
| 6,947,092 B1 * | 9/2005 | Nagata et al. .......... | 348/360 |

FOREIGN PATENT DOCUMENTS

| | | |
|---|---|---|
| JP | 1-321416 | 12/1989 |
| JP | 4-136806 | 5/1992 |

OTHER PUBLICATIONS

U.S. Appl. No. 10/015,750, filed Dec. 17, 2001, Naoya Kaneda.

* cited by examiner

*Primary Examiner*—David L. Ometz
*Assistant Examiner*—Adam L. Henderson
(74) *Attorney, Agent, or Firm*—Fitzpatrick, Cella, Harper & Scinto

(57) ABSTRACT

This invention discloses an optical apparatus including an image pickup optical unit, a light quantity adjustment unit inserted in the optical axis of the image pickup optical unit, the light quantity adjustment unit changing the aperture diameter to change the light quantity, and a controller for controlling a change of the aperture diameter by the light quantity adjustment unit. The controller changes the set value for the minimum aperture diameter of the aperture diameter of the light quantity adjustment unit in accordance with the form of the image pickup device of the image pickup apparatus on which the lens apparatus is mounted.

4 Claims, 10 Drawing Sheets

FIG. 2

ΔA: DIFFERENCE BETWEEN AVERAGE VALUE AND TARGET VALUE OF BRIGHTNESS SIGNAL IN AE GATE

| | POWER SUPPLY ON | AUTO MODE OPERATION | |
|---|---|---|---|
| | | EXPOSURE CONTROL BY APERTURE STOP | APERTURE LIMIT |
| CTL | · TRANSMIT INFORMATION CONCERNING PIXEL PITCH OF IMAGE PICKUP DEVICE | · TRANSMIT ΔA | · TRANSMIT ΔA |
| LENS MICRO-COMPUTER | · SET DIFFRACTION LIMIT F VALUE (Fth) OF SMALL APERTURE (BASED ON CONTENT OF CTL) | · DETERMINE THAT APERTURE ATTAINS TO LIMIT F VALUE AND PERFORM OPERATION TO ATTAIN ΔA=0 | · DEMAND TO TRANSMIT F=Fth IN CASE OF OVEREXPOSING SIGN OF ΔA AND F=Fth |
| APPARATUS MICRO-COMPUTER | · TRANSMIT RESET SIGNAL | · CALCULATE ΔA | · SPEED UP SHUTTER SPEED IN ACCORDANCE WITH F=Fth |
| LTC | · TRANSMIT RESET OK SIGNAL | · TRANSMIT CURRENT F VALUE IF NECESSARY | · F=Fth |

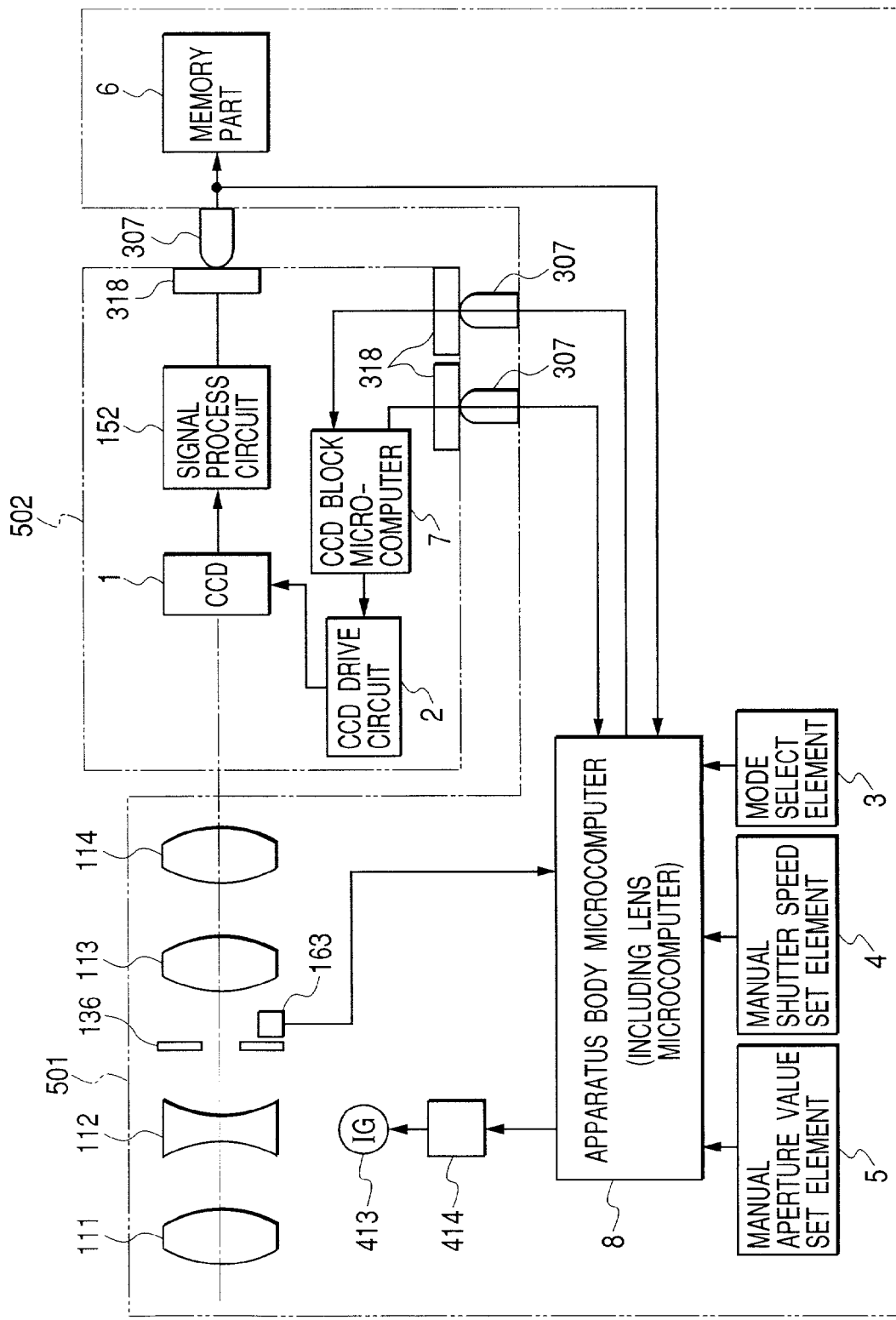

OPTICAL APPARATUS INCLUDING IMAGE PICK-UP DEVICE AND INTERCHANGEABLE LENS WITH CONTROLLER FOR CONTROLLING CHANGE OF APERTURE

BACKGROUND OF THE INVENTION

1. Field of the Invention

The present invention relates to an optical apparatus and, more particularly, to an optical apparatus including a plurality of image pickup apparatuses using different forms of image pickup devices, an interchangeable lens applied to these image pickup apparatuses, and an aperture stop unit for the interchangeable lens.

2. Related Background Art (1) Conventional Description of General Lens for Video Camera A conventional most-well-known zoom lens for a video camera is made up of four lens units: a fixed positive lens unit, movable negative lens unit, fixed positive lens unit, and movable positive lens unit sequentially from the object side. In addition to this arrangement, zoom lenses with various lens arrangements are also known.

FIGS. 6A and 6B are sectional views showing the barrel structure of a zoom lens having the most popular four-lens-unit arrangement described above. FIG. 6B is a sectional view taken along the line 6B—6B in FIG. 6A.

The zoom lens is constituted by four lens units: a fixed front lens 201a, a variator lens unit 201b which moves along the optical axis to change the magnification, a fixed afocal lens 201c, and a focus lens unit 201d which moves along the optical axis to maintain the focal plane and adjusts the focus in changing the magnification.

Guide bars 203, 204a, and 204b are arranged parallel to an optical axis 205 to guide moving lenses and stop rotation of them. A DC motor 206 functions as a drive source for moving the variator lens unit 201b. FIGS. 6A and 6B show DC motors as a drive source for the variator lens unit 201b, but a stepping motor may be used similarly to a drive source (to be described later) for moving the focus lens unit 201d.

The variator lens unit 201b is held by a holding frame 211. The holding frame 211 has a press spring 209, and a ball 210 engaged by the force of the press spring 209 in a screw groove formed in a screw bar 208. The screw bar 208 is rotated and driven by the DC motor 206 via an output shaft 206a and gear train 207, thereby moving the holding frame 211 in the optical axis direction along the guide bar 203.

The focus lens unit 201d is held by a holding frame 214. A screw member 213 is integrated into the holding frame along the optical axis near the sleeve (element fitted in the guide bar to form a guide) of the holding frame 214. A stepping motor 212 rotates an output shaft 212a of the stepping motor 212. An external thread formed on the output shaft 212a, and an internal thread or rack formed in the screw member 213 interlock with this rotation. By this interlocking rotation, the screw member 213 allows the holding frame 214 to move in the optical axis direction along the guide bars 204a and 204b. A detailed structure of the coupling portion between the holding frame 214 and the screw member 213 is disclosed in Japanese Patent Application Laid-Open No. 4-136806.

As described above, the interlocking mechanism by the stepping motor 212 may be a variator driving mechanism. One reference position along the optical axis of the holding frame may be set detectable by a photointerrupter (not shown) and a light-shielding wall integrated with the holding frame, in order to detect the absolute position of a moving lens along the optical direction when moving the lens by using this stepping motor 212. In this case, a position detection means can be constituted which detects the absolute position of the holding frame by successively counting the number of drive steps applied to the stepping motor 212 after the holding frame is located at the reference position.

In addition to the DC motor 206 and stepping motor 212, some known arrangements adopt a linear actuator of moving coil (or magnet) type that is made up of a coil (or magnet) attached to the holding frame and a magnet (or coil) attached to the fixed side.

(2) Conventional Description of Image Pickup Apparatus

FIG. 7 is a block diagram showing the electrical arrangement of a conventional image pickup apparatus. The same reference numerals as in FIGS. 6A and 6B denote parts having the same functions.

In FIG. 7, the image pickup apparatus comprises a solid-state image pickup device 221 such as a CCD. A zoom drive source 222 for the variator lens unit 201b includes the DC motor 206, the gear train interlocked with the DC motor 206, and the screw bar 208 in FIG. 6A. Alternatively, the zoom drive source 222 is comprised of a stepping motor similarly to the drive source of the focus lens unit 201d in FIGS. 6A and 6B. A drive source 223 for the focus lens unit 201d includes the stepping motor 212, the output shaft with an external thread, and the screw member 213 integrated with the holding frame along the optical axis.

The image pickup apparatus further comprises an aperture stop drive source 224. A zoom encoder 225 and focus encoder 227 detect the absolute positions of the variator lens unit 201b and focus lens unit 201d along the optical axis. When the variator drive source is realized by a DC motor, as shown in FIGS. 6A and 6B, an absolute position encoder such as a volume (not shown in FIGS. 6A and 6B) may be used. This encoder may be of magnetic type. When a stepping motor is used for the drive source, it is general to locate the holding frame at a reference position and successively count the number of operation pulses input to the stepping motor, as described above.

An aperture stop encoder 226 is, e.g., one which incorporates a Hall element in a motor serving as an aperture stop source and detects the relationship in rotational position between the rotor and the stator. A camera signal process circuit 228 performs predetermined amplification and gamma correction for an output from the CCD 221. A contrast signal of an image signal having undergone the predetermined process passes through an AE gate 229 and AF gate 230. That is, these gates set from the entire frame a signal extraction range optimal for determining the exposure and adjusting the focus. The gate size is variable and in some cases a plurality of gates are adopted, but a detailed description thereof will be omitted for descriptive convenience.

An AF signal process circuit 231 for AF (Auto Focus) generates one or a plurality of outputs concerning the high-frequency component of an image signal. The image pickup apparatus has a zoom switch 233. A zoom trucking memory 234 stores information about a prospective focus lens position corresponding to the object distance and variator lens position in changing the magnification. The zoom trucking memory may be a memory in the CPU. A CPU 232 controls various circuits.

In this arrangement, when the user operates the zoom switch 233, the CPU 232 drives and controls the zoom drive source 222 and focus drive source 223 such that the current absolute position of the variator lens unit 201b along the optical axis as the detection result of the zoom encoder 225 coincides with a calculated prospective position of the variator lenses, and the current absolute position of the focus lens unit 201d along the optical axis as the detection result of the focus encoder 227 coincides with a calculated prospective position of the focus lenses, so as to maintain a predetermined positional relationship between the variator lens unit 201b and the focus lens unit 201d that is calculated based on information in the zoom trucking memory 234.

In autofocus operation, the CPU 232 drives and controls the focus drive source 223 such that an output from the AF signal process circuit 231 exhibits a peak.

To obtain correct exposure, the CPU 232 drives and controls the aperture stop source 224 and controls the aperture diameter based on an output from aperture stop encoder 226 so as to set the average value of outputs of Y signals (brightness signals) having passed through the AE gate 229 to a predetermined value.

(3) Conventional Description of Television Signal Autofocus Method in Image Pickup Apparatus with Above Arrangement This method has no drawback such as necessary for without any cost for another sensor because an autofocus sensor also serves as the image pickup device of an image pickup apparatus. In this method, since an image state on an imaging plane is directly detected, for example, even when a temperature change expands or contracts the lens barrel to change the focal position, a correct focus position can be detected in accordance with this change.

FIG. 8 shows this principle. The abscissa represents the lens position for focus adjustment, and the ordinate represents the high-frequency component (focal point voltage) of an image pickup signal. The focal point voltage exhibits a peak at a position indicated by the arrow in FIG. 8. This position A is an in-focus lens position.

An example of obtaining the focal point voltage F will be described.

FIG. 9A shows an actual image pickup field having a view angle 320, a range 318 for extracting an image pickup signal for autofocus adjustment, and an object 319 to be sensed.

In FIG. 9B, (a) represents the state of the object in the image pickup signal extraction range, and (b) represents an image pickup (brightness) signal (Y signal) of the object in (a). This signal is differentiated into a waveform (c), and absolutized into a waveform (d). A sampled and held signal (e) of the resultant signal is the focal point voltage F. This utilizes the fact that particularly the high-frequency component of the contrast signal of an object to be sensed maximizes in an in-focus state. The focal point voltage generation method includes various methods in addition to this method.

A high-pass filter is often used to extract only a high-frequency component. It is also known that a filter having several kinds of characteristics is prepared, focal point voltages are set for a plurality of frequencies, and a correct focus is secured based on these pieces of information.

FIG. 10 is a view showing the main part of an image pickup apparatus as a combination of such an autofocus adjustment apparatus and an inner focus lens.

An image pickup device such as a CCD is located at an imaging position 505. A brightness signal Y is generated by a signal process circuit (not shown) or the like on the basis of an output from the image pickup device, and information within a predetermined frame is received by an AF circuit 521. The AF circuit 521 obtains a focal point voltage by the above-described method or the like. An in-focus or out-of-focus state, and a rear- or front-focus state for the out-of-focus state are determined based on the focal point voltage value, the driving direction of a focus lens 504B, and the sign of a change in focal point voltage upon drive. A focus lens drive motor 522 is driven in a predetermined direction on the basis of the determination result. In FIG. 10, a front lens 501, variator lens 502, and afocal lens 504A are arranged.

This autofocus method is called a "television signal autofocus" in which the image sensor of the image pickup apparatus also serves as an autofocus sensor. Thus, the imaging state of the imaging plane is directly measured, and the focal state can always be grasped with high precision. To determine a far- or near-focus state by this method when the focus greatly deviates, the focus lens is vibrated by a predetermined small amount along the optical axis to measure an increase or decrease in focal point voltage signal. Even if the signal increase or decrease cannot be obtained, the focus lens is driven in either direction to measure a signal change. In this method, a relatively long time is taken from an out-of-focus state to an in-focus state.

(4) Conventional Description of Zoom Trucking

As shortly described in (2), the focus lens during zoom takes a different trucking locus in accordance with the object distance in focusing by lenses behind a variator lens in an image pickup apparatus having the arrangement as shown in FIG. 7. For this reason, the focus must be maintained even during zoom by measuring the absolute positions of the variator and focus lenses along the optical axis at the start of zoom, specifying a prospective positional relationship between the two lenses during zoom, and performing operation so as to keep these positions. This operation is called zoom trucking.

As this method, Japanese Patent Application Laid-Open No. 1-321416 discloses the following method. More specifically, focus lens positions for a plurality of variator lens positions between the wide angle end and the telephoto end are stored in accordance with a plurality of object distances. At the start of zoom, the current variator and focus lens positions are checked on map information stored in a memory means in a microcomputer. Interpolation calculation is executed based on data stored nearest to the front-focus side from the obtained point with the same focal length, and data stored nearest to the rear-focus side. Focus lens positions are calculated for respective focal lengths (variator lens positions).

FIG. 11 is a view of the trucking curve (locus) near the telephoto end. The abscissa represents the variator lens position; Vn, the telephoto end position; and the ordinate, the focus lens position.

For example, P1, P4, P7, and P10 are stored for an infinite distance, and P2, P5, P8, and P11 are stored for 10 m. If the lens is moved for zoom toward the wide angle end while the focus lens position is at point P (object distance is between 10 m and the infinity at the telephoto end), the positional relationship between the variator lens and the focus lens is controlled to sequentially track $P_A$, $P_B$, and $P_C$ from P. The positions $P_A$ to $P_C$ are positions where the interpolation ratio between upper and lower stored loci LL1 and LL2 is constant.

(5) Conventional Description of Lens-Interchangeable Image Pickup System

It is well known that a lens can be interchanged from an image pickup apparatus body in an image pickup apparatus having the above arrangement.

FIG. 12 is a block diagram showing an example of a lens-interchangeable image pickup system. A zoom lens made up of a four, positive, negative, positive, and positive lens units from the object side will be exemplified, similar to the above description, but the image pickup system may employ another arrangement.

In FIG. 12, the lens side comprises a fixed front lens 111, a variator lens 112 which moves along the optical axis to change the magnification, an aperture stop unit 136, and a fixed afocal lens 113. A focus lens 114 performs focus operation when the object distance changes, and also functions as a compensator during zoom. Drive sources 145, 413, and 137 are for the variator lens 112, aperture stop unit 136, and focus lens 114, respectively, and are driven and controlled by a lens microcomputer 410 via drive circuits 161, 414, and 162, respectively.

In this example, the image pickup apparatus body side comprises three image pickup devices 303 to 305 such as CCDs. Their image pickup signals are amplified by amplifiers 405 to 407, and processed into an image pickup signal by an signal process circuit 152. The image pickup signal is transmitted to an apparatus microcomputer 409.

The two microcomputers 409 and 410 are connected via a transmission path by contact between contacts 318 and 307. The microcomputers 409 and 410 exchange various signals through this transmission path.

If the signal process circuit 152 generates a focal point voltage for the above-mentioned television signal autofocus in this arrangement, the information is transmitted from the apparatus microcomputer 409 to the lens microcomputer 410. The lens microcomputer 410 determines an in-focus or out-of-focus state on the basis of the signal information, or determines the direction and drive speed of the focus lens 114 depending on the direction (rear- or front-focus state) and degree of the out-of-focus state. Then, the lens microcomputer 410 drives the drive source 137 via the drive circuit 162.

(6) Conventional Description of Image Pickup Device

An image pickup device such as a CCD is attaining a diagonal length of about 6 mm or 4 mm that is called 1/3 or 1/4 in a consumer video camera. The image pickup device has 310,000 pixels within this size. A digital still camera uses a so-called megapixel CCD of 2,000,000 pixels within about 1/2" (diagonal length: about 8 mm), and is ensuring an image quality almost equal to that obtained by a conventional silver halide camera for at least a popular small print size.

The diameter of permissible circle of confusion is about 12 to 15 $\mu$m in the video camera and about 7 to 8 $\mu$m in the digital still camera. This is a very small numerical value in comparison with a diameter of permissible circle of confusion of 33 to 35 $\mu$m for a 135 film format because the diagonal size of the frame is much smaller than a 43-mm diagonal size of a silver halide camera. This value is predicted to decrease more in the future.

From another viewpoint, the focal length for obtaining the same angle of view can be shortened in an image pickup apparatus using such a CCD in comparison with a 135 film camera because of a small image size. The angle of view obtained at a standard focal length of 40 mm by the 135 film is 4 mm in a camera using a 1/4 CCD. Thus, the depth of field in image pickup with the same F value is very long in the image pickup apparatus using the CCD.

As is well known, the depth of field is determined by "permissible circle of confusion×F". For example, for F=2, the depth of field is "0.035×2=0.07 mm" in a 135 film camera, but "0.07×2=0.14 mm" in a 1/2" digital still camera which is 1/5 that of the 135 film camera.

As for an image pickup device such as a 1/3" CCD having the same diagonal line, e.g., 6 mm, there are known various forms of image pickup devices such as CCDs including image pickup devices which attain higher resolution by increasing the number of pixels to one million pixels or in the future two to several million pixels, and image pickup devices which ensure the pixel size, sensitivity, and dynamic range while slightly suppressing the number of pixels.

In this manner, a CCD to be used changes depending on whether high resolution is important or the sensitivity or dynamic range is important. In addition, the form is also changed depending on whether the optical path must be shielded by a mechanical shutter during charge transfer (read of all pixels or not).

For example, a film camera selectively uses a low-sensitivity, ultra-fine-grain film which puts emphasis on high-resolution image pickup, and a high-sensitivity film with lower resolution in accordance with the intended use. Similarly, a CCD to be used also changes depending on the image pickup purpose.

As is well known, the optical diffraction phenomenon occurs when light passes through a small hole. In the image pickup apparatus, the image quality is readily decreased by the diffraction phenomenon with the use of a megapixel CCD of a small pixel pitch. For example, even with the same 1/3" CCD, a video camera of a large pixel pitch (small number of pixels) can be practically used up to F16 or F22, but a digital camera of 1,000,000 pixels can only be used up to F8 or F11, and a digital camera of 2,000,000 pixels can only be used up to F5.6 or F8. Although these numerical values are merely an example, the F value which causes diffraction of a small aperture changes to a smaller F value as the resolution qualitatively increases.

To prevent this, the F value as a limit aperture diameter is set to a unique value in a lens-integrated image pickup apparatus such as a video camera so as not to use a smaller F value.

However, when the same lens interchangeable from an image pickup apparatus can be mounted on different image pickup apparatuses with image pickup devices, such as a video camera, a digital still camera with a higher-resolution CCD, and a digital still camera with higher sensitivity, or when the image pickup device can be interchanged from the image pickup apparatus in accordance with the intended use, the following problems arise unless the F value as a limit aperture diameter is set changeable in accordance with the CCD form (e.g., the numerical value of the pixel pitch).

a) The image degrades due to the diffraction phenomenon depending on a selected CCD.
b) The exposure adjustable range by the aperture stop unit is excessively limited depending on a selected CCD.

SUMMARY OF THE INVENTION

It is the first object of the present invention to provide a lens or image pickup system which prevents image degradation caused by the diffraction phenomenon without limiting the exposure adjustable range by an aperture member even if an optimal image pickup apparatus body is selectively used for a single lens in accordance with the intended use such as high-sensitivity image pickup, high-resolution image pickup, or image pickup of a moving picture.

It is the second object of the present invention to provide an image pickup system which prevents image degradation caused by the diffraction phenomenon without limiting the exposure adjustable range by an aperture stop unit even if an optimal image pickup system apparatus is mounted on an apparatus body in accordance with the intended use such as high-sensitivity image pickup, high-resolution image pickup, or image pickup of a moving picture.

It is the third object of the present invention to provide a lens or image pickup system capable of issuing a warning to avoid image degradation in advance when an aperture diameter smaller than a limit value must be used based on information concerning arbitrary set exposure control.

To achieve the above object, according to the present invention, there is provided a lens apparatus interchangeably mounted on a plurality of image pickup apparatuses having different forms of image pickup devices, comprising an image pickup optical unit, a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, wherein the controller changes a set value of the light quantity adjustment unit for a minimum aperture diameter of the aperture diameter in accordance with the form of the image pickup device of the image pickup apparatus on which the lens apparatus is mounted.

According to the present invention, there is provided an optical apparatus including at least any one of a plurality of image pickup apparatuses having different forms of image pickup devices, and a lens apparatus interchangeably mounted on the one image pickup apparatus, the one image pickup apparatus and the lens apparatus having contacts for performing transmission between the one image pickup apparatus and the lens apparatus, the optical apparatus comprising an image pickup optical unit which is included in the lens apparatus, a light quantity adjustment unit inserted in an optical path of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device from the image pickup apparatus by transmission via the contacts, wherein the controller changes a set value of the light quantity adjustment unit for a minimum aperture diameter of the aperture diameter in accordance with the information concerning the form of the image pickup device of the image pickup apparatus that is obtained by the transmission.

According to the present invention, there is provided an optical apparatus including any one of a plurality of image pickup units which include image pickup devices and have different forms of the image pickup devices, and a main body unit which includes an image pickup optical unit on which the one image pickup unit is mounted to form an image on the image pickup device, and a memory part for storing an image pickup signal from the image pickup unit, the one image pickup unit and the main body unit having contacts for performing transmission between the one image pickup unit and the main body unit, the optical apparatus comprising a light quantity adjustment unit inserted in an optical path of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device from the image pickup unit by transmission via the contacts, wherein the controller changes a set value of the light quantity adjustment unit for a minimum aperture diameter of the aperture diameter in accordance with the information concerning the form of the image pickup device of the image pickup unit that is obtained by the transmission.

According to the present invention, there is provided a lens apparatus interchangeably mounted on a plurality of image pickup apparatuses which have different forms of image pickup devices and a plurality of image pickup modes, comprising an image pickup optical unit, a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, wherein the controller changes a set value of the light quantity adjustment unit for a minimum aperture diameter of the aperture diameter in accordance with the form of the image pickup device in a preset image pickup mode out of the plurality of image pickup modes of the image pickup apparatus on which the lens apparatus is mounted.

According to the present invention, there is provided a lens apparatus interchangeably mounted on a plurality of image pickup apparatuses which have different forms of image pickup devices and a plurality of image pickup modes, comprising an image pickup optical unit, a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, wherein the controller changes a set value of the light quantity adjustment unit for a minimum aperture diameter of the aperture diameter in accordance with the form of the image pickup device of the image pickup apparatus on which the lens apparatus is mounted, and the controller inhibits setting an aperture value of which an aperture diameter becomes smaller than the changed set value of the minimum aperture diameter in an aperture priority image pickup mode out of the plurality of image pickup modes of the image pickup apparatus.

According to the present invention, there is provided a lens apparatus interchangeably mounted on a plurality of image pickup apparatuses which have different forms of image pickup devices and a plurality of image pickup modes, comprising an image pickup optical unit, a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, wherein the controller changes a set value of the light quantity adjustment unit for a minimum aperture diameter of the aperture diameter in accordance with the form of the image pickup device of the image pickup apparatus on which the lens apparatus is mounted, and the controller issues a warning from the image pickup apparatus when an aperture value or shutter speed with which an aperture diameter becomes smaller than the changed set value of the minimum aperture diameter is set in an image pickup mode of arbitrarily changing the aperture value or shutter speed out of the plurality of image pickup modes of the image pickup apparatus.

According to the present invention, there is provided an optical apparatus including at least any one of a plurality of image pickup apparatuses which have different forms of image pickup devices and a plurality of image pickup modes, and a lens apparatus interchangeably mounted on the one image pickup apparatus, the one image pickup apparatus and the lens apparatus having contacts for performing transmission between the one image pickup apparatus and the lens apparatus, the optical apparatus comprising an image pickup optical unit which is included in the lens apparatus, a light quantity adjustment unit inserted in an optical path of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup apparatus by transmission via the contacts, wherein the controller changes a set value of the light quantity adjustment unit for a minimum aperture diameter of the aperture diameter in accordance with the information concerning the form of the image pickup device of the image pickup apparatus that is obtained by the transmission when the information concerning the image pickup mode obtained by the transmission represents a preset image pickup mode out of the plurality of image pickup modes.

According to the present invention, there is provided an optical apparatus including any one of a plurality of image pickup units which include image pickup devices and have different forms of the image pickup devices, and a main body unit which has a plurality of image pickup modes and includes an image pickup optical unit on which the one image pickup unit is mounted to form an image on the image pickup device, and a memory part for storing an image pickup signal from the image pickup unit, the one image pickup unit and the main body unit having contacts for performing transmission between the one image pickup unit and the main body unit, the optical apparatus comprising a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup unit by transmission via the contacts, wherein the controller changes a set value of the light quantity adjustment unit for a minimum aperture diameter of the aperture diameter in accordance with the information concerning the form of the image pickup device of the image pickup unit that is obtained by the transmission when the information concerning the image pickup mode obtained by the transmission represents a preset image pickup mode out of the plurality of image pickup modes.

According to the present invention, there is provided an optical apparatus including at least any one of a plurality of image pickup apparatuses which have different forms of image pickup devices and a plurality of image pickup modes, and a lens apparatus interchangeably mounted on the one image pickup apparatus, the one image pickup apparatus and the lens apparatus having contacts for performing transmission between the one image pickup apparatus and the lens apparatus, the optical apparatus comprising an image pickup optical unit which is included in the lens apparatus, a light quantity adjustment unit inserted in an optical path of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup apparatus by transmission via the contacts, wherein the controller changes a set value of the light quantity adjustment unit for a minimum aperture diameter of the aperture diameter in accordance with the information concerning the form of the image pickup device of the image pickup apparatus that is obtained by the transmission, and the controller inhibits setting an aperture value of which an aperture diameter becomes smaller than the changed set value of the minimum aperture diameter when the image pickup mode obtained by the transmission is an aperture priority image pickup mode out of the plurality of image pickup modes of the image pickup apparatus.

According to the present invention, there is provided an optical apparatus including at least any one of a plurality of image pickup apparatuses which have different forms of image pickup devices and a plurality of image pickup modes, and a lens apparatus interchangeably mounted on the one image pickup apparatus, the one image pickup apparatus and the lens apparatus having contacts for performing transmission between the one image pickup apparatus and the lens apparatus, the optical apparatus comprising an image pickup optical unit which is included in the lens apparatus, a light quantity adjustment unit inserted in an optical path of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup apparatus by transmission via the contacts, wherein the controller changes a set value of the light quantity adjustment unit for a minimum aperture diameter of the aperture diameter in accordance with the information concerning the form of the image pickup device of the image pickup apparatus that is obtained by the transmission, and the controller transmits information representing a warning to the image pickup apparatus via the contacts when the image pickup mode obtained by the transmission is an image pickup mode of arbitrarily changing an aperture value or shutter speed, and when the aperture value or shutter speed with which an aperture diameter becomes smaller than the changed set value of the minimum aperture diameter is set.

According to the present invention, there is provided an optical apparatus including any one of a plurality of image pickup units which include image pickup devices and have different forms of the image pickup devices, and a main body unit which has a plurality of image pickup modes and includes an image pickup optical unit on which the one image pickup unit is mounted to form an image on the image pickup device, and a memory part for storing an image pickup signal from the image pickup unit, the one image pickup unit and the main body unit having contacts for performing transmission between the one image pickup unit and the main body unit, the optical apparatus comprising a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup unit by transmission via the contacts, wherein the controller changes a set value of the light quantity adjustment unit for a minimum aperture diameter of the aperture diameter in accordance with the information concerning the form of the image pickup device of the image pickup unit that is obtained by the transmission, and the controller inhibits setting an aperture value of which an aperture diameter becomes smaller than the changed set value of the minimum aperture diameter when the image pickup mode obtained by the transmission is an aperture priority image pickup mode out of the plurality of image pickup modes.

According to the present invention, there is provided an optical apparatus including any one of a plurality of image pickup units which include image pickup devices and have different forms of the image pickup devices, and a main body unit which has a plurality of image pickup modes and includes an image pickup optical unit on which the one image pickup unit is mounted to form an image on the image pickup device, and a memory part for storing an image pickup signal from the image pickup unit, the one image pickup unit and the main body unit having contacts for performing transmission between the one image pickup unit and the main body unit, the optical apparatus comprising a light quantity adjustment unit inserted in an optical axis of the image pickup optical unit, the light quantity adjustment unit changing an aperture diameter to change a light quantity, and a controller for controlling a change of the aperture diameter by the light quantity adjustment unit, the controller obtaining information concerning the form of the image pickup device and information concerning the image pickup mode from the image pickup unit by transmission via the contacts, wherein the controller changes a set value of the light quantity adjustment unit for a minimum aperture diameter of the aperture diameter in accordance with the information concerning the form of the image pickup device of the image pickup unit that is obtained by the transmission, and the controller transmits information representing a warning to the image pickup apparatus via the contacts when the image pickup mode obtained by the transmission is an image pickup mode of arbitrarily changing an aperture value or shutter speed, and when the aperture value or shutter speed with which an aperture diameter becomes smaller than the changed set value of the minimum aperture diameter is set.

The above and other objects, features, and advantages of the present invention will be apparent from the following description in conjunction with the accompanying drawings.

BRIEF DESCRIPTION OF THE DRAWINGS

FIG. 2 is a table for explaining transmission processes between a lens microcomputer and an apparatus microcomputer in the first embodiment of the present invention;

FIG. 3 is a block diagram showing the circuit arrangement of an optical apparatus according to the second embodiment of the present invention;

DETAILED DESCRIPTION OF THE PREFERRED EMBODIMENTS

Preferred embodiments of the present invention will be described in detail below with reference to the accompanying drawings.

(First Embodiment)

Figure 1:
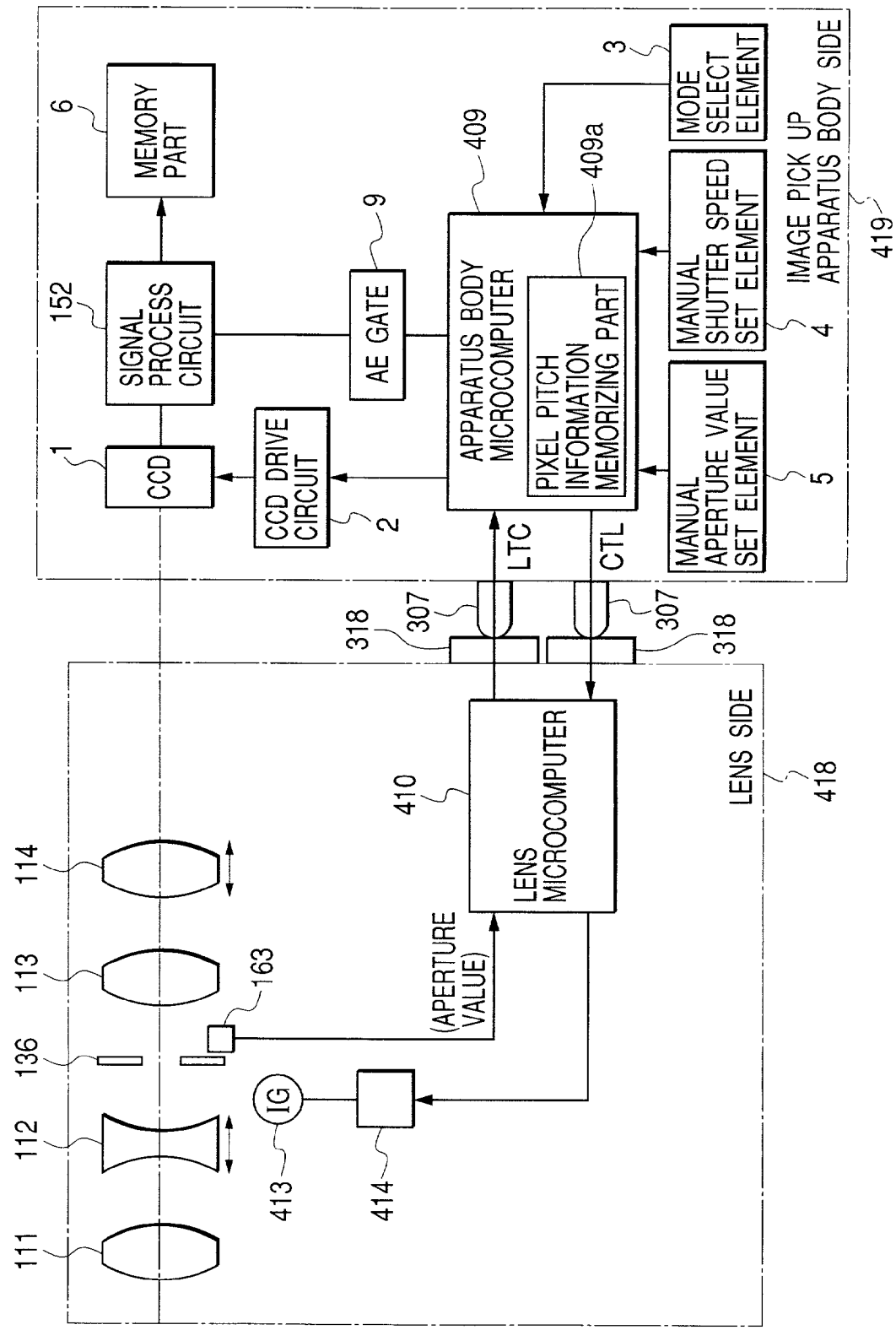
FIG. 1 is a block diagram showing the circuit arrangement of an optical apparatus according to the first embodiment of the present invention.
Figure 12:
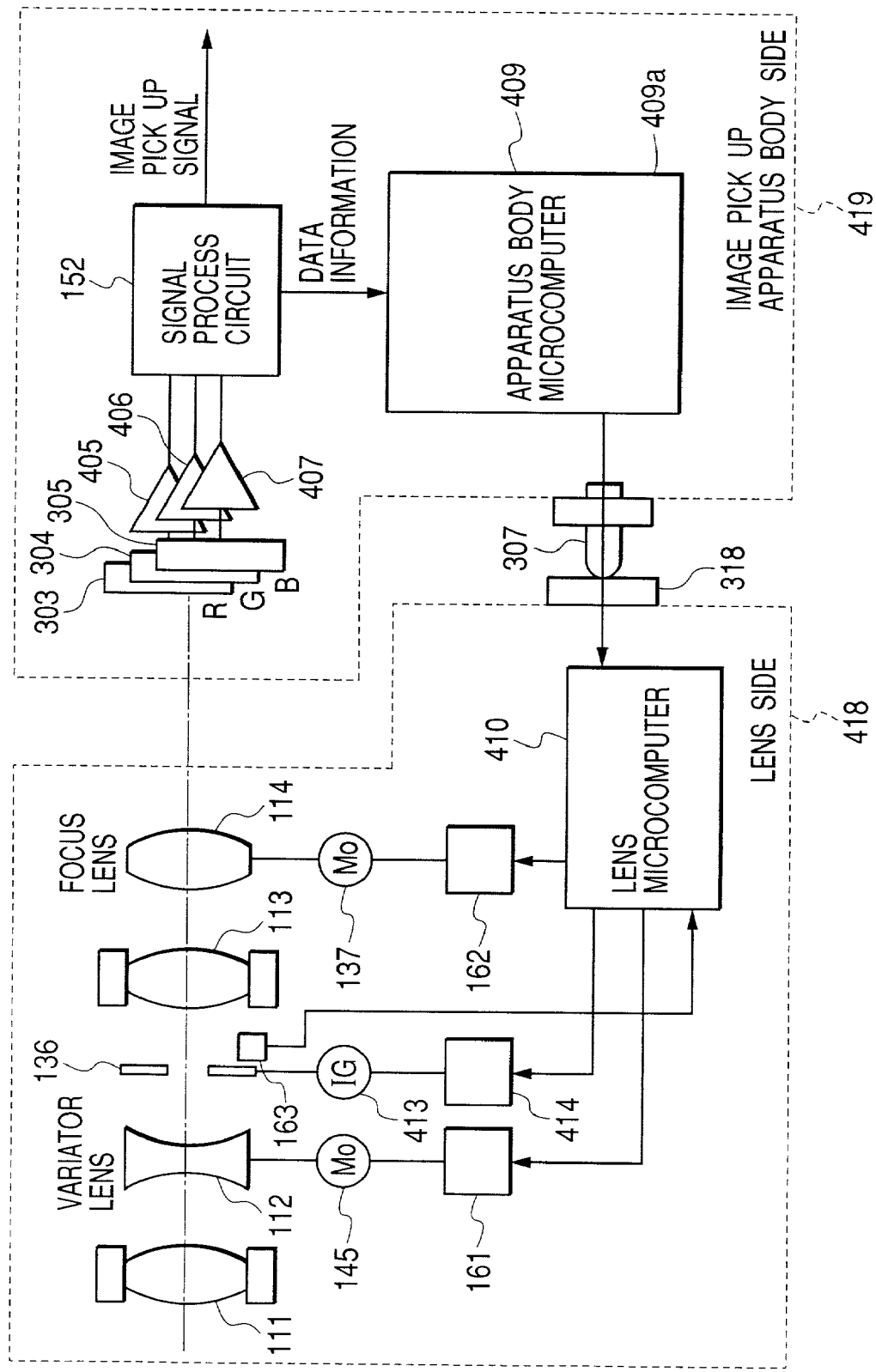
FIG. 12 is a block diagram showing the arrangement of a conventional image pickup system.

FIG. 1 is a block diagram showing the arrangement of the main part of a lens-interchangeable image pickup system according to the first embodiment of the present invention. The same reference numerals as in FIG. 12 denote parts having the same functions.

In FIG. 1, the image pickup apparatus body side comprises a CCD 1 serving as an image pickup device, and a CCD drive circuit 2 for driving the CCD 1. A mode select element 3 is used to select an image pickup mode such as an auto mode, portrait mode, aperture priority mode, and shutter priority mode. A manual shutter speed set element 4 is used to select an arbitrary shutter speed. A manual aperture value set element 5 is used to set an arbitrary aperture value. The image pickup apparatus also comprises an AE gate 9.

The lens side comprises a fixed front lens 111, a variator lens 112 which moves along the optical axis to change the magnification, an aperture stop unit 136 serving as a light quantity adjustment unit, and a fixed afocal lens 113. A focus lens 114 performs focus operation when the object distance changes, and also functions as a compensator during zoom.

A drive source 413 is for the aperture stop unit 136 and is driven and controlled by a lens microcomputer 410 via a drive circuit 414.

The image pickup apparatus body side comprises the above-described CCD 1. An image pickup signal is amplified by an amplifier (not shown), and processed into an image pickup signal by an signal process circuit 152. The image pickup signal is transmitted to an apparatus microcomputer 409.

The two microcomputers 409 and 410 are connected via a transmission path by contact between contacts 318 and 307. The microcomputers 409 and 410 exchange various signals through this transmission path.

If the signal process circuit 152 generates a focal point voltage for the above-mentioned television signal autofocus in the above arrangement, the information is transmitted from the apparatus microcomputer 409 to the lens microcomputer 410. The lens microcomputer 410 determines an in-focus or out-of-focus state on the basis of the signal information, or determines the driving direction and driving speed of the focus lens 114 depending on the direction (rear- or front-focus state) and degree of the out-of-focus state. Then, the lens microcomputer 410 drives the lens.

In the first embodiment, an image pickup apparatus body (camera body) 419 transmits information concerning the pixel pitch of the CCD to a lens 418. In accordance with this information, the lens microcomputer 410 sets the minimum limit F value of a small aperture (limit value which does not allow the aperture stop unit to change to a smaller aperture diameter).

In FIG. 1, the apparatus microcomputer 409 of the image pickup apparatus body 419 stores information concerning the pixel pitch of the CCD 1 as a mounted image pickup device in a pixel pitch information memorizing part 409a such as a memory in advance. If the lens 418 is newly mounted on the image pickup apparatus body 419 or the main power of the image pickup apparatus body is turned on (ON), a reset signal is transmitted between the apparatus microcomputer 409 and the lens microcomputer 410. Transmission is done via the mount contacts 307 and 318. FIG. 1 schematically shows CTL (Camera To Lens) operation and LTC (Lent To Camera) operation via the two contacts, but the number of contacts and the transmission direction are not limited to them.

In reset transmission operation, information concerning the pixel pitch of the CCD 1 is read in the lens microcomputer 410. The lens microcomputer 410 internally sets an Fth value as the limit F value of a usable small aperture in exposure control in accordance with the information. (Reset operation in power-ON is described in the item "POWER SUPPLY ON" shown in the table of FIG. 2.)

As described above, the apparatus microcomputer 409 transmits to the lens 418 necessary information including pixel pitch information stored in the pixel pitch information memorizing part 409a. Along with this, pixel pitch information is sent by CTL transmission (transmission from the camera (image pickup apparatus) to the lens). Upon reception of the information including the pixel pitch information, the lens microcomputer 410 determines an Fth value as the limit F value of a small aperture. For example, if information "pixel pitch: 4 μm" is sent, "F8=Fth" is set by the table present within the lens microcomputer 410, or Fth is calculated by an equation using the numerical value of the pixel pitch as a variable. In some cases, the Fth value is sent at the beginning by CTL transmission. At this time, the sent numerical value is directly set. If the CCD size is known in advance, the pixel pitch can be attained from the number of pixels. In this case, number-of-pixel information may be set by CLT transmission.

Considering Fth as F value information set in accordance with the pixel pitch value, i.e., as an F-number (F No.), the output value of an aperture stop encoder 163 that corresponds to the F-number must be set. For this purpose, the lens microcomputer 410 holds data representing the relationship between the F-number and an output from the aperture stop encoder 163 (value obtained by A/D-converting the output is also possible). In practice, the minimum aperture limit is obtained by an encoder output corresponding to Fth.

The aperture stop encoder 163 often uses a magnetic sensor incorporated in an IG motor 413. In LTC transmission (transmission from the lens to the camera), the lens microcomputer 410 notifies the apparatus microcomputer 409 that the reset signal has been transmitted without any problem. Then, reset operation is completed.

According to the first embodiment, even when a plurality of image pickup apparatus bodies with different pixel pitches of image pickup devices such as CCDs are prepared for a single lens, each image pickup apparatus body stores information concerning a mounted image pickup device, e.g., information about the number of pixels and the pixel pitch, and F value information set in accordance with the pixel pitch value. For example, after the image pickup apparatus body is mounted on the lens, the lens transmits information concerning the image pickup device. The lens side can change the set value of the aperture stop unit 136 concerning the use limit of a small aperture on the basis of the information.

This arrangement can prevent the problem that the image degrades due to small-aperture diffraction depending on an image pickup apparatus body to be combined (more specifically, depending on a CCD). An image can be appropriately picked up even by an image pickup system (optical apparatus) constituted by mounting a single lens on any one of image pickup apparatus bodies having different forms of image pickup devices.

(Second Embodiment)

The first embodiment shown in FIG. 1 has exemplified an image pickup system as a combination of an image pickup apparatus body and interchangeable lens. As shown in FIG. 3, the second embodiment of the present invention will exemplify an image pickup system (optical apparatus) as a combination of an image pickup unit 502 including a CCD 1 serving as an image pickup device, a signal process circuit 152, a CCD drive (driver) circuit 2, and a CCD block microcomputer 7, and a main body unit 501 including lenses 111 to 114, a microcomputer 8, and a memory part 6. That is, the second embodiment provides an image pickup system (optical apparatus) constituted by combining any one of image pickup units 502 having different forms of image pickup devices to the main body unit 501.

In FIG. 3, the CCD block microcomputer 7 stores information concerning the pixel pitch of the CCD 1 in a memory part (not shown) such as a memory. The CCD block microcomputer 7 transmits signals to the apparatus microcomputer 8 via contact blocks 318 and 307, as shown in FIG. 1. In reset transmission, the CCD block microcomputer 7 transmits pixel pitch information of the CCD 1. The apparatus microcomputer 8 can control the aperture stop by changing the aperture set value of an aperture stop unit 136 concerning the use limit of a small aperture on the basis of the pixel pitch information of the mounted image pickup unit 502 regardless of the form of the image pickup device thereof. Thus, image degradation by the diffraction phenomenon can be prevented.

(Third Embodiment)

An image pickup system (optical apparatus) according to the third embodiment of the present invention will be described. Either of the image pickup system arrangements in FIGS. 1 and 3 can be applied, and the third embodiment will be exemplified using the arrangement of FIG. 1.

If the image pickup mode is set to an auto mode or portrait mode by a mode select element 3 in an image pickup system having the arrangement of FIG. 1, settings of the shutter speed and aperture value by set elements 4 and 5 are ignored or the shutter speed and aperture value cannot be set.

This operation is summarized in the item "AUTO MODE OPERATION" in FIG. 2.

In a situation where the exposure can be controlled in a general aperture stop, an apparatus microcomputer 409 calculates a difference $\Delta A$ between the average value and target value of a brightness signal in an AE gate 9. For example, a positive difference $\Delta A$ means overexposure, and a negative difference $\Delta A$ means underexposure. The exposure is determined to be correct for "$|\Delta A| < \Delta Ath$" ($\Delta Ath$: the threshold of $\Delta A$), but a detailed description thereof will be omitted. $\Delta A$ is transmitted to a lens microcomputer 410 by CTL transmission. The lens microcomputer 410 checks the sign of transmitted $\Delta A$, and drives an aperture stop unit 136 in a closing direction for a sign "+" and in an opening direction for a sign "−". If necessary, the lens microcomputer 410 transmits the current F value by LTC transmission. This feedback control keeps $\Delta A=0$ (or $|\Delta A| < \Delta Ath$; $\Delta Ath$ is the threshold of $\Delta A$), obtaining correct exposure.

If overexposure occurs even after the aperture value reaches Fth which is the limit F value of a small aperture, the operation in the item "APERTURE LIMIT" in FIG. 2 is executed. In CTL transmission, $\Delta A$ is transmitted. The lens microcomputer 410 detects that $\Delta A$ is positive (overexposure) but the aperture value has reached Fth. Since the aperture stop cannot be changed to a smaller aperture value, the lens microcomputer 410 notifies the apparatus microcomputer 409 of F (aperture value)=Fth (limit aperture value of a small aperture). Because of F=Fth and positive $\Delta A$, the apparatus microcomputer 409 changes the shutter speed of a shutter (not shown) to a higher one, obtaining correct exposure. The shutter (not shown) includes a shutter mechanism on the optical axis in front of the CCD 1 or on the optical axis of the lenses 111 to 114, and an electronic shutter function of changing the light accumulation time of light-receiving pixels on the CCD 1.

Figure 4:
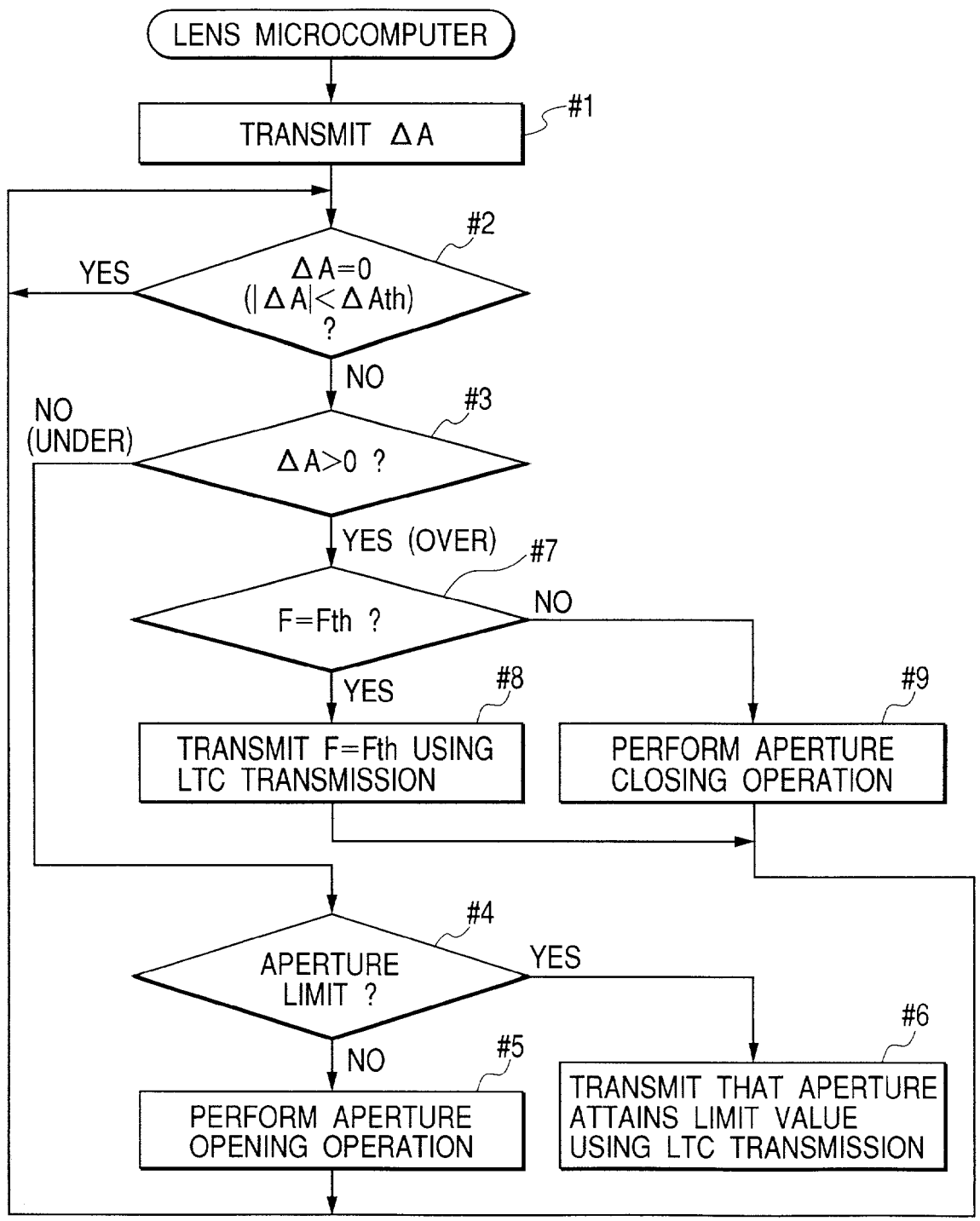
FIG. 4 is a flow chart showing the operation of the main part of a lens microcomputer in an optical apparatus according to the third embodiment of the present invention.
Figure 5:
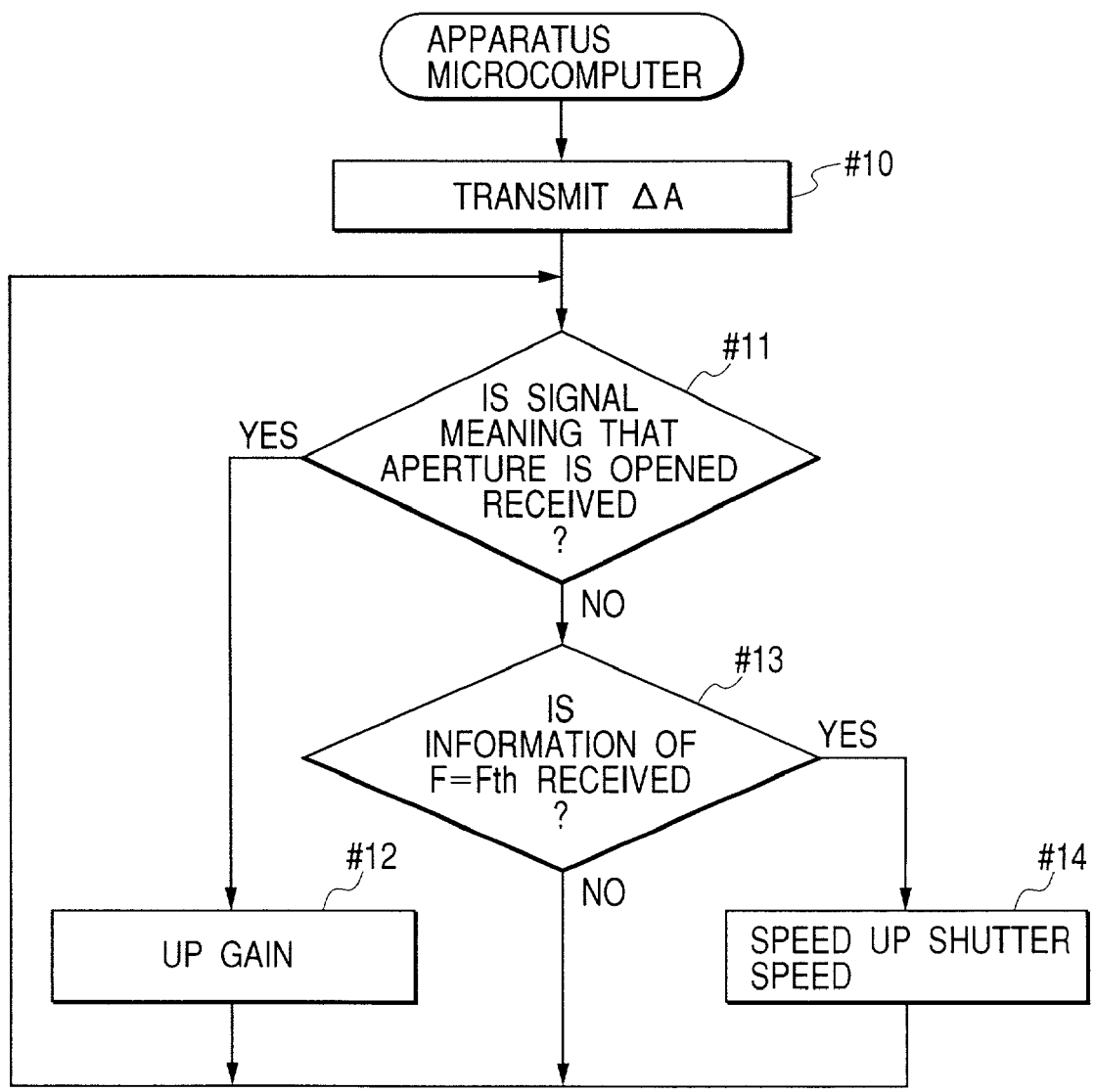
FIG. 5 is a flow chart showing the operation of the main part of a camera microcomputer in the optical apparatus according to the third embodiment of the present invention.
Figure 6A:
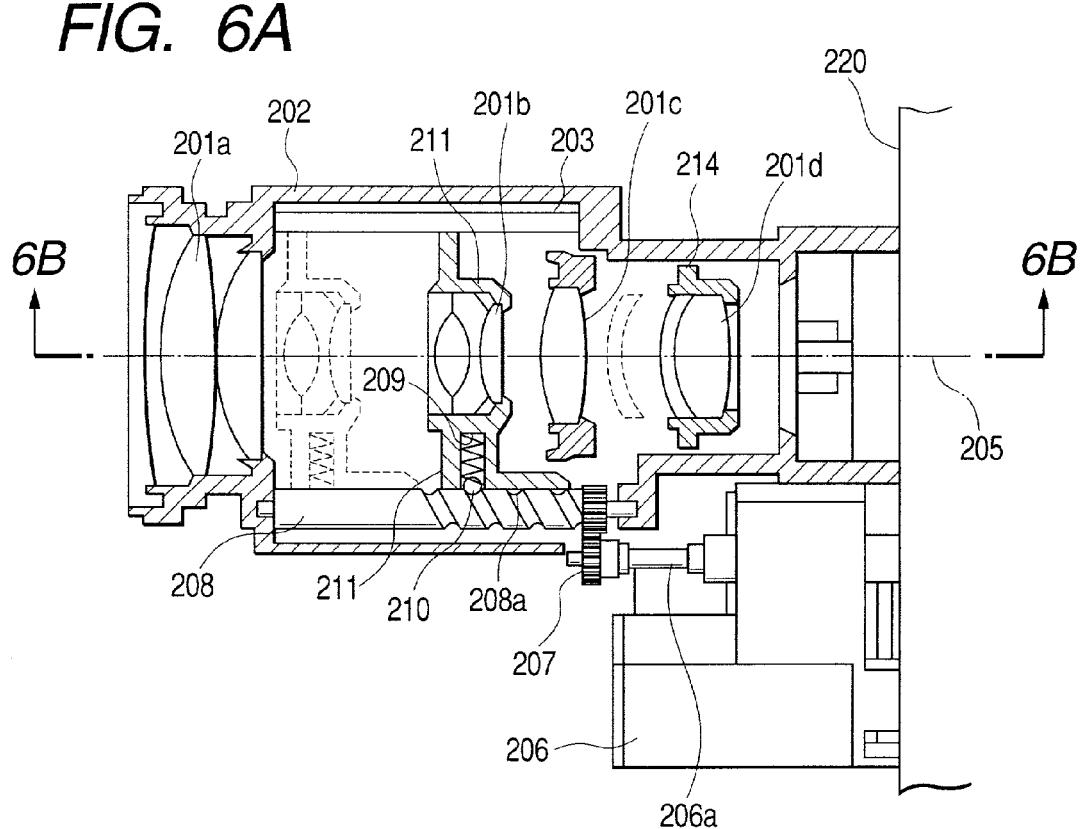
FIGS. 6A and 6B are sectional views showing the structure of a general lens for a video camera.
Figure 6B:
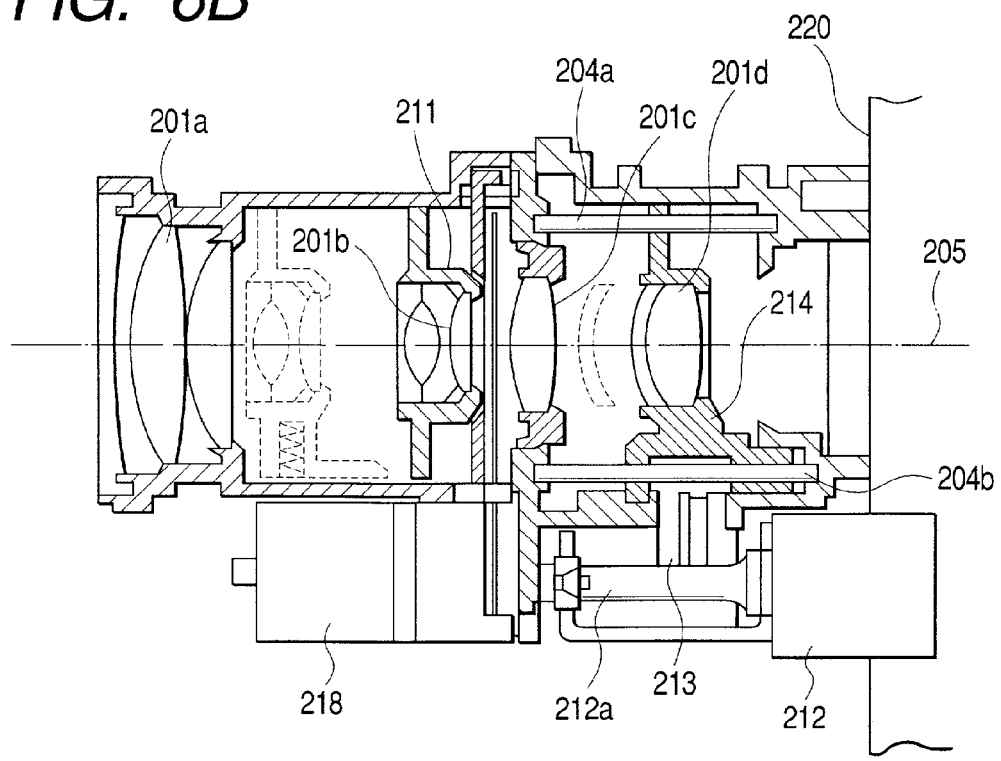
Figure 7:
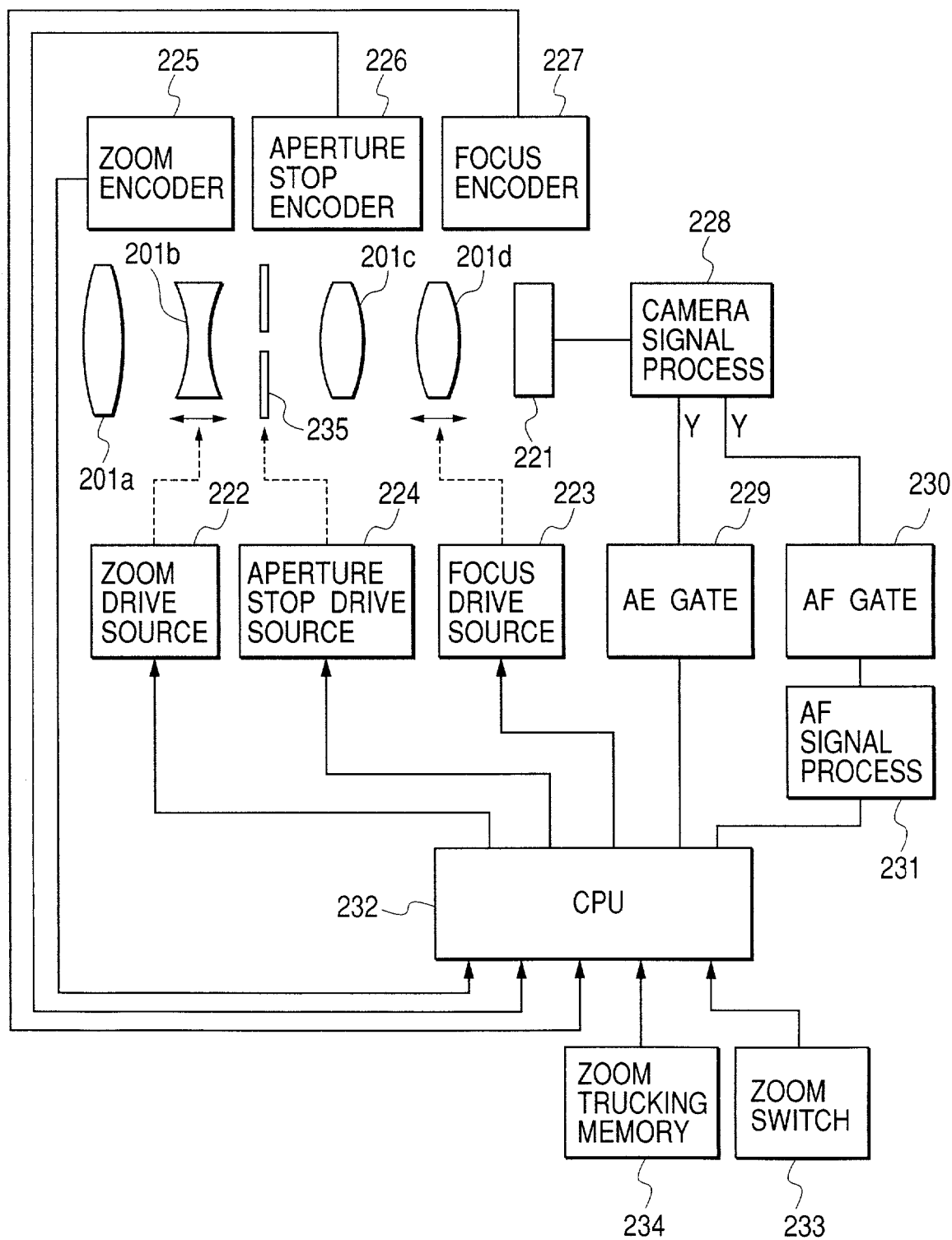
FIG. 7 is a block diagram showing the circuit arrangement of a general image pickup apparatus.
Figure 8:
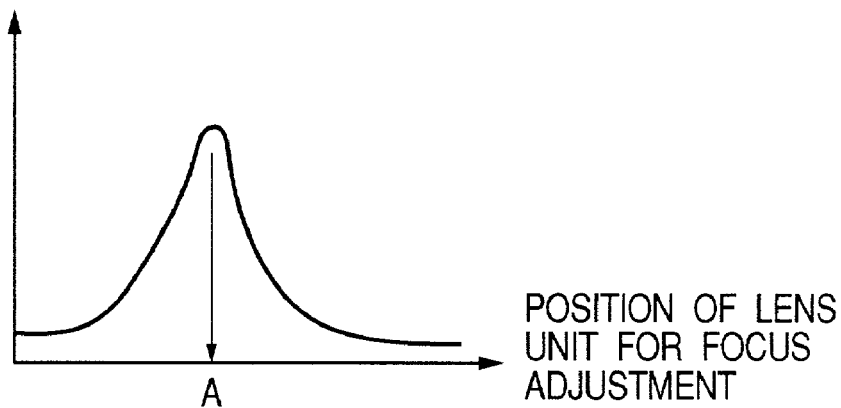
FIG. 8 is a graph for explaining a television signal autofocus method in the image pickup apparatus of FIG. 7.
Figure 9A:
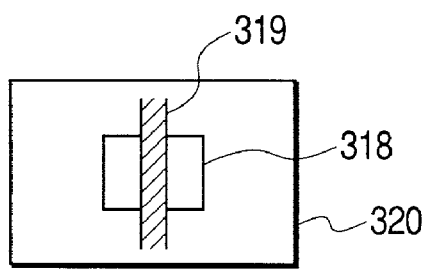
FIGS. 9A and 9B are views for explaining the television signal autofocus method in the image pickup apparatus of FIG. 7.
Figure 9B:
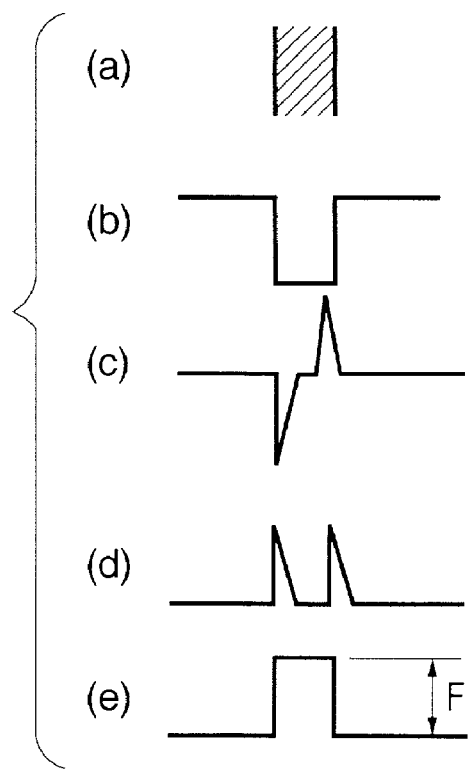
Figure 10:
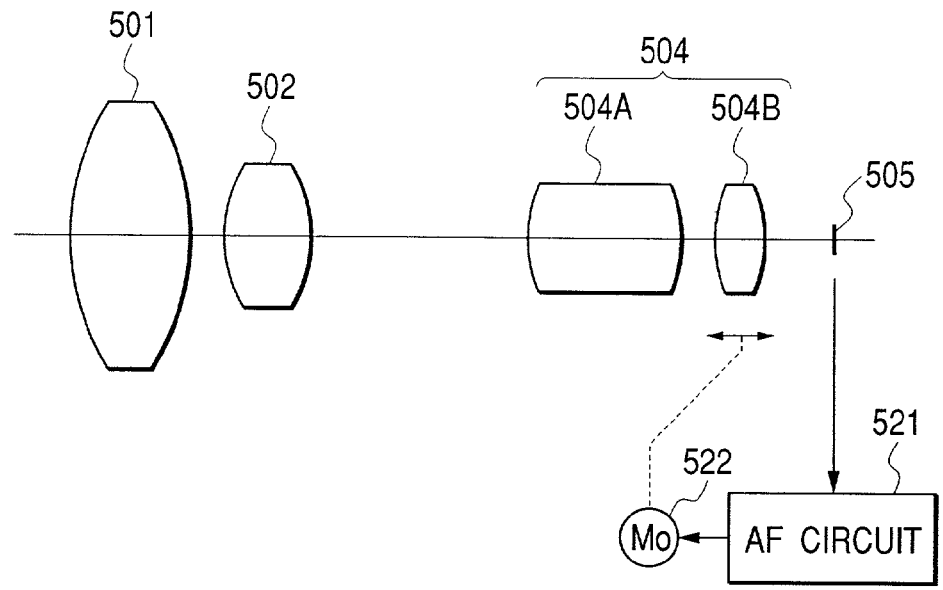
FIG. 10 is a view for explaining a general zoom trucking method in an image pickup apparatus.
Figure 11:
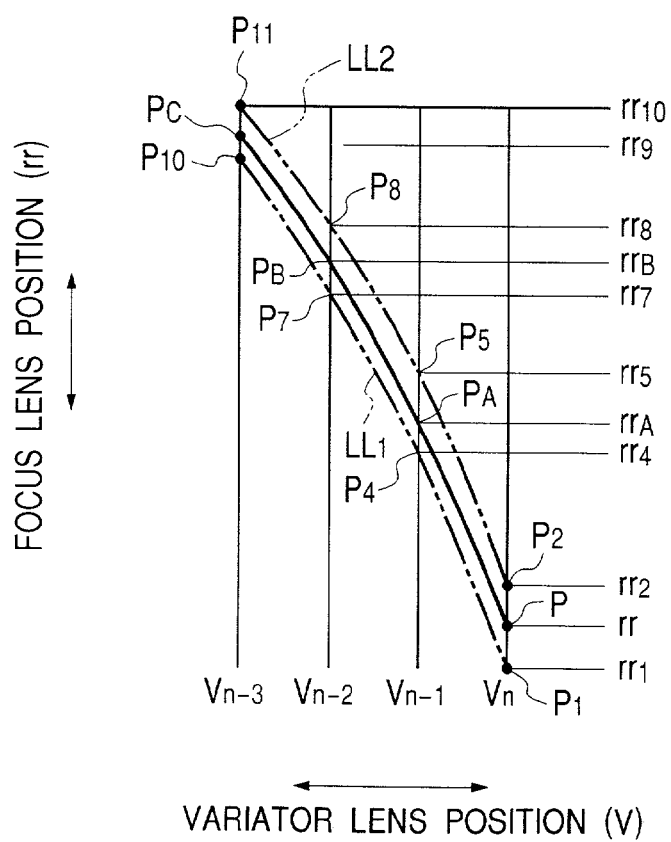
FIG. 11 is a graph for explaining the zoom trucking method.

FIGS. 4 and 5 are flow charts showing processes by the lens microcomputer 410 and apparatus microcomputer 409 during the above-described operation. More specifically, FIGS. 4 and 5 show the operation when an auto exposure adjustment image pickup mode such as an auto mode or portrait mode is selected. When the third embodiment is applied to an image pickup system (optical system) as shown in FIG. 3, the camera microcomputer 8 in FIG. 3 performs the following operation.

In the auto mode, the camera automatically sets the exposure. In the portrait mode, the camera automatically sets such exposure as to emphasize a main object such as a person.

The process by the lens microcomputer 410 will be explained with reference to the flow chart of FIG. 4.

In step #1, the lens microcomputer 410 receives a $\Delta A$ value transmitted by CTL transmission. In step #2, the lens microcomputer 410 checks whether $\Delta A=0$ (in some cases, $|\Delta A| < \Delta Ah$) holds. If YES in step #2, the lens microcomputer 410 returns to step #1.

If NO in step #2, the lens microcomputer 410 advances to step #3 to check overexposure or underexposure on the basis of sign determination. If underexposure is determined in step #3, the lens microcomputer 410 advances to step #4 to check whether the aperture stop unit 136 reaches an aperture limit. If NO in step #4, the lens microcomputer 410 shifts to step #5 to drive the aperture stop unit 136 in an opening direction. If YES in step #4, the lens microcomputer 410 shifts from step #4 to #6 to transmit to the apparatus microcomputer 409 that the aperture stop attains the limit value.

If overexposure is determined in step #3, the lens microcomputer 410 advances to step #7 to check whether the Fth value set based on pixel pitch information of the CCD 1 in reset transmission and the current F value satisfy "F=Fth" (in practice, not the F value but an encoder output is used for equivalent comparison). If F=Fth does not hold (not a small aperture), the lens microcomputer 410 shifts to step #9 to close the aperture stop unit 136. If F=Fth holds, the lens microcomputer 410 shifts to step #8 to transmit "F=Fth" to the apparatus microcomputer 409 by LTC transmission.

This flow may include another routine for returning the F value to F=Fth when the F value becomes smaller than Fth due to any reason.

The process by the apparatus microcomputer 409 will be explained with reference to the flow chart of FIG. 5.

In step #10, the apparatus microcomputer 409 transmits a calculated $\Delta A$ value to the lens microcomputer 410 by CTL. If the apparatus microcomputer 409 determines in step #11 that it has received a signal meaning that the aperture stop is opened, from the lens microcomputer 410 by LTC, the apparatus microcomputer 409 advances to step #12 to confirm underexposure again (not shown) and perform "up gain" (up CCD sensitivity).

If the apparatus microcomputer 409 has received in step #11 "F=Fth" meaning that the aperture stop unit 136 is not opened, the apparatus microcomputer 409 advances to step #13 to confirm overexposure again (not shown). If YES in step #13, the apparatus microcomputer 409 shifts to step #14 to speed up the shutter speed of a shutter (not shown).

The operation in the auto mode has been described, and the same operation is also done in the portrait mode.

According to the third embodiment, the limit value of a small aperture in the aperture stop unit 136 is changed in accordance with information concerning the pixel pitch of a CCD used so as to prevent image degradation caused by small-aperture diffraction. Especially in a full automatic exposure adjustment mode called a portrait mode or auto mode, the aperture stop unit 136 is prevented from operating to an aperture value smaller than the limit value.

Accordingly, image degradation by the diffraction phenomenon can be prevented without excessively limiting the exposure adjustable range by the aperture stop.

(Fourth Embodiment)

The third embodiment assumes a mode called an portrait mode or auto mode. The fourth embodiment of the present invention will exemplify a case wherein an F value of an aperture diameter smaller than F=Fth is set in a manual mode or the aperture stop unit operates to an F value of an aperture diameter smaller than F=Fth when correct exposure is to be obtained at a set shutter speed in a shutter priority mode.

In this case, a lens microcomputer 410 notifies an apparatus microcomputer 409 of an aperture diameter smaller than F=Fth by LTC transmission. Then, an image pickup apparatus body 419 displays on a display (not shown) such as an electronic viewfinder or LCD viewfinder a warning message that image degradation occurs owing to small-aperture diffraction.

This warning may be issued to the user by lights-on or flashing of an LED lamp or sound in addition to display of the warning message.

In this fashion, any warning that image degradation occurs due to diffraction is issued when the aperture value or shutter speed is manually set or when an aperture diameter smaller than a limit value must be used at a set shutter speed in the shutter speed priority mode. In accordance with this warning, the user attaches, e.g., an ND filter to avoid image degradation. In the aperture priority mode, image degradation can be avoided by inhibiting setting the F value to an aperture diameter smaller than a limit value. Image degradation may also be prevented by installing in a lens 418 an ND filter having a plurality of transmission light quantity values or a filter capable of changing the transmission light quantity, and automatically or manually inserting the ND filter or filter in the optical axis in front of the CCD 1.

The above-described embodiments optimally control the exposure when a plurality of image pickup apparatus bodies with different CCD forms allow interchanging lenses and can use a common lens in an image pickup system such as a video camera or digital camera using an image pickup device such as a CCD. Even if a plurality of image pickup apparatus bodies with different pixel pitches of image pickup devices such as CCDs are prepared for a single lens, information concerning the image pickup device is transmitted to the lens side, and the lens side changes the limit value of a small aperture on the basis of the information. Thus, a system and lens free from any image degradation caused by small-aperture diffraction can be provided regardless of a combination of a lens and an image pickup apparatus body having any form of an image pickup device (or image pickup system apparatus and apparatus body).

The exposure control range by the aperture stop can be maximally utilized without any image degradation caused by the diffraction phenomenon even if an optimal image pickup apparatus body (camera body) is selectively used for a single lens in accordance with the intended use such as high-sensitivity image pickup, high-resolution image pickup, or image pickup of a moving picture, or if an optimal image pickup system apparatus is mounted on an image pickup apparatus body in accordance with high-sensitivity image pickup, high-resolution image pickup, or image pickup of a moving picture.

When an aperture diameter smaller than a limit value must be used at an arbitrarily set shutter speed, a message of this effect is issued to cause the user to attach, e.g., an ND filter or to inhibit image pickup. This can also prevent image degradation.

As has been described above, the above embodiments can provide a lens or image pickup system which prevents image degradation caused by the diffraction phenomenon without limiting the exposure adjustable range by an aperture stop even if an optimal image pickup apparatus body is selectively used for a single lens in accordance with the intended use such as high-sensitivity image pickup, high-resolution image pickup, or image pickup of a moving picture.

The above embodiments can provide an image pickup system which prevents image degradation caused by the diffraction phenomenon without limiting the exposure adjustable range by an aperture even if an optimal image pickup system apparatus is mounted on an apparatus body in accordance with the intended use such as high-sensitivity image pickup, high-resolution image pickup, or image pickup of a moving picture.

The above embodiments can provide a lens or image pickup system capable of issuing a warning to avoid image degradation in advance when an aperture diameter smaller than a limit value must be used based on information concerning arbitrary set exposure control.

What is claimed is:

1. An optical apparatus including at least any one of a plurality of image pickup apparatuses which have different forms of image pickup devices and a plurality of image pickup modes, and a lens apparatus interchangeably mounted on the one image pickup apparatus, the one image pickup apparatus and the lens apparatus having contacts for performing transmission between the one image pickup apparatus and the lens apparatus, the optical apparatus comprising:

an image pickup optical unit which is included in the lens apparatus;

a light quantity adjustment unit inserted in an optical path of the image pickup optical unit, said light quantity adjustment unit changing an aperture diameter to change a light quantity; and a controller for controlling a change of the aperture diameter by said light quantity adjustment unit, said controller obtaining information concerning the form of the image pickup device and information concerning the image pickup mode from the image pickup apparatus by transmission via the contacts, wherein said controller changes a set value of said light quantity adjustment unit for a minimum aperture diameter of the aperture diameter in accordance with the information concerning the form of the image pickup device of the image pickup apparatus that is obtained by the transmission when the information concerning the image pickup mode obtained by the transmission represents a preset image pickup mode out of the plurality of image pickup modes.

2. An apparatus according to claim 1, wherein the preset image pickup mode includes an automatic exposure adjustment image pickup mode.

3. An apparatus according to claim 1, wherein the information concerning the form of the image pickup device includes information concerning a pixel pitch of each pixel of the image pickup device.

4. An apparatus according to claim 1, wherein the information concerning the form of the image pickup device includes at least one information out of the number of pixels of the image pickup device, a pixel pitch of each pixel, and an aperture value set in accordance with the pixel pitch.

* * * * *

UNITED STATES PATENT AND TRADEMARK OFFICE
CERTIFICATE OF CORRECTION

PATENT NO. : 6,992,720 B2  Page 1 of 1
APPLICATION NO. : 10/000084
DATED : January 31, 2006
INVENTOR(S) : Naoya Kaneda It is certified that error appears in the above-identified patent and that said Letters Patent is hereby corrected as shown below:

COLUMN 3
Line 24, "drawbach" should read --drawback--.

COLUMN 5
Line 3, "a four" should read --four--.

COLUMN 13
Line 42, "Lent" should read --Lens--.

COLUMN 16
Lime 60, "an" should read --a--.

Signed and Sealed this

Fifteenth Day of August, 2006

JON W. DUDAS
*Director of the United States Patent and Trademark Office*